US012532239B2

(12) United States Patent
Srivastava et al.

(10) Patent No.: US 12,532,239 B2
(45) Date of Patent: Jan. 20, 2026

(54) LOCATION-SPECIFIC WIRELESS LOCAL AREA NETWORK OFFLOAD RESTRICTIONS FOR USER EQUIPMENT BASED ON WIRELESS WIDE AREA RADIO BAND(S)

(71) Applicant: Cisco Technology, Inc., San Jose, CA (US)

(72) Inventors: Vimal Srivastava, Karnataka (IN); Ravi Kiran Guntupalli, Cumming, GA (US); Piyush Srivastava, Navi Mumbai (IN); Amit Shivhare, Gurgaon (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 313 days.

(21) Appl. No.: 18/471,575

(22) Filed: Sep. 21, 2023

(65) Prior Publication Data
US 2024/0298234 A1    Sep. 5, 2024

(30) Foreign Application Priority Data
Mar. 1, 2023    (IN) .............................. 202341013758

(51) Int. Cl.
*H04W 36/22*    (2009.01)
*H04W 12/06*    (2021.01)
*H04W 36/32*    (2009.01)

(52) U.S. Cl.
CPC .......... *H04W 36/22* (2013.01); *H04W 12/06* (2013.01); *H04W 36/322* (2023.05)

(58) Field of Classification Search
CPC ... H04W 36/22; H04W 12/06; H04W 36/322; H04W 28/0865; H04W 36/1446;
(Continued)

(56) References Cited

U.S. PATENT DOCUMENTS 10,271,243 B2 *    4/2019    Phuyal .................. H04W 88/10
10,524,168 B2 *    12/2019   Faccin .............. H04W 36/0064
(Continued)

FOREIGN PATENT DOCUMENTS

WO    2024127347 A1    6/2024

OTHER PUBLICATIONS

International Search Report and Written Opinion for International Application No. PCT/US2024/017038, mailed May 23, 2024, 14 Pages.
(Continued)

*Primary Examiner* — Brandon J Miller
(74) *Attorney, Agent, or Firm* — Edell, Shapiro & Finnan, LLC

(57) ABSTRACT

Provided herein are techniques to facilitate location-specific wireless local area network (WLAN) offload restrictions for user equipment based on wireless wide area network (WWAN) radio band(s). In at least one example, a method performed by an authentication server of a WLAN may include, for a user equipment (UE) that is connected to an NR radio band of a WWAN and is seeking to connect to the WLAN, querying a subscription element of the WWAN to obtain a location indicator and an NR radio band indicator for the UE; determining, based on the location indicator and the NR radio band indicator, whether the UE is allowed or required to offload to the WLAN; and based on determining that the UE is allowed to offload from the WWAN to the WLAN, facilitating a WLAN association response message to be sent to the UE for offloading the UE to the WLAN.

20 Claims, 6 Drawing Sheets

(58) Field of Classification Search
CPC ..... H04W 48/04; H04W 84/12; H04W 12/63; H04W 4/02; H04W 88/06; H04L 63/107
See application file for complete search history.

(56) References Cited

U.S. PATENT DOCUMENTS

| | | | |
|---|---|---|---|
| 2015/0056995 A1 | 2/2015 | Baillargeon | |
| 2015/0222410 A1 | 8/2015 | Belghoul et al. | |
| 2015/0223115 A1 | 8/2015 | Liang et al. | |
| 2015/0249950 A1 | 9/2015 | Teyeb et al. | |
| 2015/0282058 A1 | 10/2015 | Forssell | |
| 2015/0327129 A1* | 11/2015 | Faccin ............... | H04W 36/144 370/331 |
| 2018/0146408 A1 | 5/2018 | Meylan et al. | |
| 2018/0249376 A1 | 8/2018 | Forssell et al. | |
| 2021/0112488 A1* | 4/2021 | Meredith ............. | H04W 12/06 |
| 2022/0007267 A1 | 1/2022 | Maattanen et al. | |

OTHER PUBLICATIONS

3GPP, "3rd Generation Partnership Project; Technical Specification Group Core Network and Terminals; 5G System, Usage of the Unified Data Repository Service for Policy Data, Application Data and Structured Data for Exposure; Stage 3 (Release 18)," Technical Specification, 3GPP TS 29.519, V18.2.0, Jun. 2023, 252 pages.

3Gpp, "3rd Generation Partnership Project; Technical Specification Group Core Network and Terminals; 5G System; Usage of the Unified Data Repository services for Subscription Data; Stage 3 (Release 18)," Technical Specification, 3GPP TS 29.505, V18.2.0, Jun. 2023, 325 pages.

3GPP, "3rd Generation Partnership Project; Technical Specification Group Core Network and Terminals; Evolved Packet System (EPS); 3GPP EPS AAA interfaces (Release 18)," Technical Specification, 3GPP TS 29.273, V18.2.0, Mar. 2023, 202 pages.

3GPP, "3rd Generation Partnership Project, Technical Specification Group Core Network and Terminals; Home Subscriber Server (HSS) diameter interfaces for interworking with packet data networks and applications (Release 18)," Technical Specification, TS 29.336, V18.1.0, Jun. 2023, 82 pages.

Calhoun, P., et al., "Diameter Network Access Server Application," Network Working Group, RFC: 4005, Standards Track, Aug. 2005, 85 pages.

Cisco, "SaMOG Gateway Overview," SaMOG Administration Guide, StarOS Release 21, Apr. 14, 2022, 78 pages.

Dekok, A., "Remote Authentication Dial-In User Service (RADIUS) Protocol Extensions," Internet Engineering Task Force (IETF), RFC: 6929, Standards Track, Apr. 2013, 68 pages.

3GPP, "5G; 5G System; Usage of the Unified Data Repository Service for Policy Data, Application Data and Structured Data for Exposure; Stage 3 (3GPP TS 29.519 version 17.10.0 Release 17)," Technical Specification, ETSI TS 129 519, V17.10.0, Apr. 2023, 238 pages.

3GPP, "5G; 5G System, Usage of the Unified Data Repository services for Subscription Data; Stage 3 (3GPP TS 29.505 version 17.10.0 Release 17)," Technical Specification, ETSI TS 129 505, V17.10.0, Jul. 2023, 280 pages.

3GPP, "Digital cellular telecommunications system (Phase 2+) (GSM); Universal Mobile Telecommunications System (UMTS); LTE; 5G; Sh interface based on the Diameter protocol; Protocol details (3GPP TS 29.329 version 17.0.0 Release 17)," Technical Specification, ETSI TS 129 329, V17.0.0, Apr. 2022, 30 pages.

3GPP, "Universal Mobile Telecommunications System (UMTS); LTE; 5G; Evolved Packet System (EPS); 3GPP EPS AAA interfaces (3GPP TS 29.273 version 17.6.0 Release 17)," Technical Specification, ETSI TS 129 273, V17.6.0, Apr. 2023, 219 pages.

3GPP, "Universal Mobile Telecommunications System (UMTS); LTE; Home Subscriber Server (HSS) diameter interfaces for interworking with packet data networks and applications (3GPP TS 29.336 version 17.3.0 Release 17)," Technical Specification, ETSI TS 129 336, V17.3.0, May 2022, 90 pages.

Fajardo, V., et al., "Diameter Base Protocol," Internet Engineering Task Force (IETF), RFC: 6733, Standards Track, Oct. 2012, 152 pages.

Rigney, C., et al., "Remote Authentication Dial In User Service (RADIUS)," Network Working Group, RFC: 2865, Standards Track, Jun. 2000, 76 pages.

Tsou, T., et al., "Realm-Based Redirection In Diameter," Internet Engineering Task Force (IETF), RFC: 7075, Standards Track, Nov. 2013, 10 pages.

Zorn, G., et al., "RADIUS Attributes for Tunnel Protocol Support," Network Working Group, RFC: 2868, Informational, Jun. 2000, 20 pages.

* cited by examiner

LOCATION-SPECIFIC WIRELESS LOCAL AREA NETWORK OFFLOAD RESTRICTIONS FOR USER EQUIPMENT BASED ON WIRELESS WIDE AREA RADIO BAND(S)

PRIORITY CLAIM

This application claims the benefit of priority to Indian Provisional Application No. 202341013758, filed Mar. 1, 2023, the entirety of which application is incorporated herein by reference.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical.

DETAILED DESCRIPTION

Overview

Figure 1:
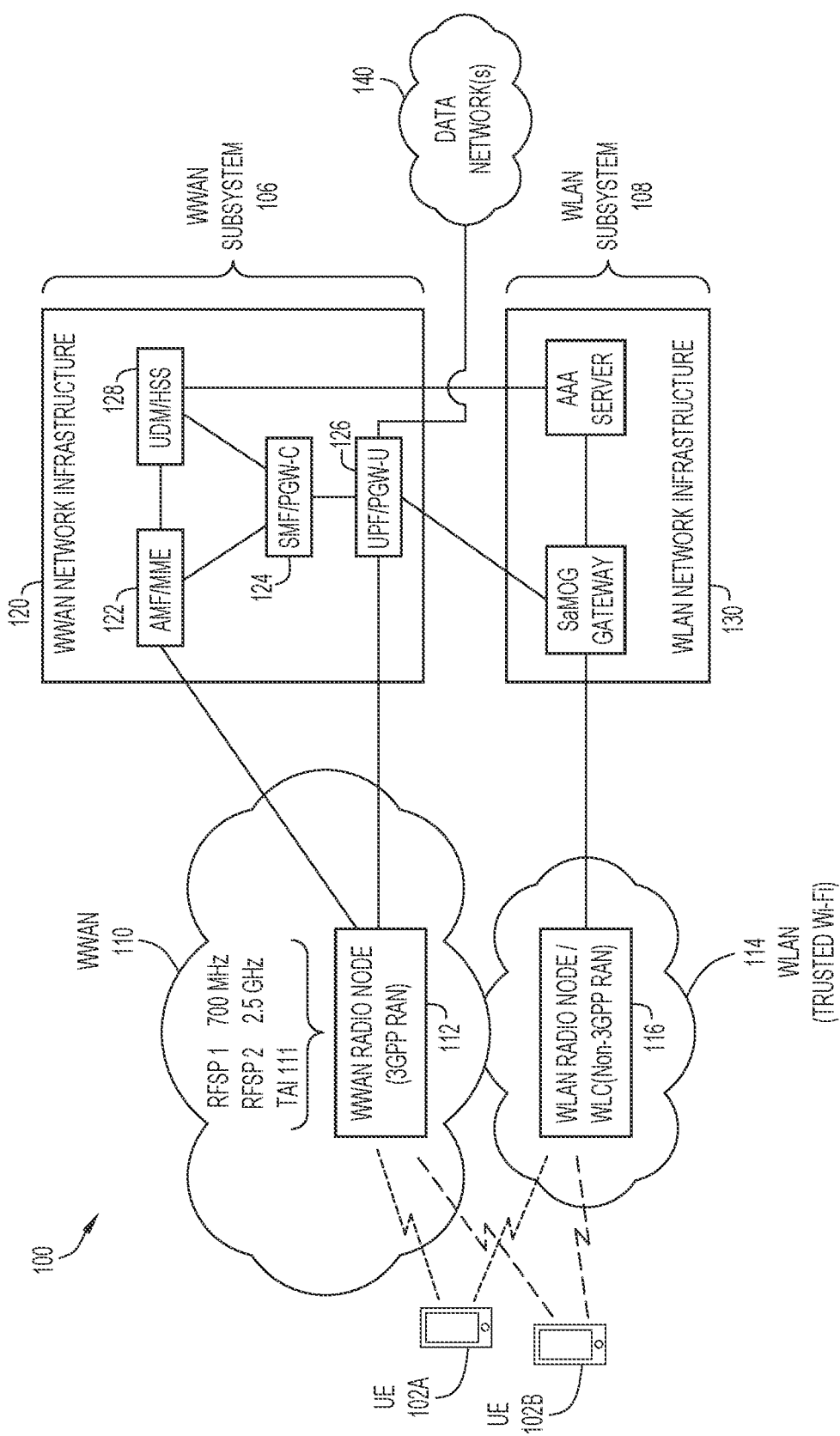
FIG. 1 illustrates a system in which location-specific wireless local area network (WLAN) offload restrictions may be provided for user equipment based on one or more wireless wide area network (WWAN) radio bands, according to an example embodiment.

Provided herein are techniques for supporting location-specific wireless local area network (WLAN) (e.g., an Institute of Electrical and Electronics Engineers (IEEE) 802.11 or Wi-Fi® radio access network (RAN)) offload restrictions for user equipment based on connection of the user equipment to particular wireless wide area network (WWAN) radio band(s) for a RAN/radio access technology (RAT) type, such as one or more particular New Radio (NR) radio bands for Third Generation Partnership Project (3GPP) Fifth Generation (5G) RAN, at a particular location of a WWAN.

WLAN offload restrictions as discussed for embodiments herein can be viewed differently depending on whether such restrictions are applied from the perspective of user equipment that may be restricted (e.g., controlled, or at the extreme, prohibited) from offloading to a WLAN from a WWAN or from the perspective of user equipment that may be restricted, in other words, mandated, to offload to a WLAN from a WWAN (or, stated differently, may be restricted from remaining on the WWAN).

For example, in some embodiments WLAN offload restrictions may be utilized to support restricting some user equipment that latch onto (e.g., connect to) a particular NR band, such as the 2.5 Gigahertz (GHz) NR band at a particular location for WWAN from offloading to a WLAN, while allowing or mandating other user equipment that latch onto other NR radio bands at the particular location for the WWAN (e.g., latched onto NR band(s) that are not the 2.5 GHz band) to offload to the WLAN.

In some embodiments, however, WLAN offload restrictions may be utilized to restrict some user equipment that latch onto a particular radio band, such as the 700 Megahertz (700 MHz) NR band at a particular location of a WWAN, from remaining connected to the WWAN such that such user equipment are mandated or required to offload from the WWAN to a WLAN, while other user equipment that are not latched onto the particular radio band (e.g., are latched onto the 2.5 GHz band) may remain connected to the WWAN and not be offloaded to the WLAN.

Such offload restrictions-whether restricting some user equipment connecting to a WWAN via a particular NR band from offloading to a WLAN or restricting (i.e., mandating) some user equipment to offload to a WLAN based on connection to a WWAN via a particular NR band—may be utilized to improve user experience, both for users associated with user equipment that may be allowed to offload to the WLAN and for users associated with the user equipment that may not be allowed to offload to the WLAN.

In at least one embodiment, a computer-implemented method is provided that may be performed by an authentication server of a WLAN that may include, for a user equipment that is connected to a NR radio band of a WWAN and is seeking to connect to the WLAN, querying a subscription data management element of the WWAN to obtain a location indicator of the user equipment within the WWAN and an NR radio band indicator for the user equipment that identifies the NR radio band of the WWAN to which the user equipment is connected; determining, based on the location indicator of the user equipment within the WWAN and the NR radio band indicator for the user equipment, whether the user equipment is allowed or required to offload from the WWAN to the WLAN; and based on determining that the user equipment is allowed or required to offload from the WWAN to the WLAN, facilitating a WLAN association response message to be sent to the user equipment for offloading the user equipment to the WLAN.

Example Embodiments

Some mobile network operators have deployed private networks that provide trusted wireless local area network (WLAN) connectivity through a WLAN radio node, a wireless LAN controller (WLC), and WLAN network infrastructure that includes a SaMOG (S2a Mobility Over GTP (General Packet Radio Service (GPRS) Tunneling Protocol) gateway and an Authentication, Authorization, and Accounting (AAA) server.

In some instances, when a user equipment (UE) latches on to a wireless wide area network (WWAN), such as a Third Generation Partnership Project (3GPP) Fourth Generation (4G)/Long Term Evolution (LTE) radio access network (RAN), that includes private network coverage, such as trusted WLAN coverage, the mobile network can be configured to offload the UE to the private/trusted WLAN. To enable such behavior, the trusted WLAN can be configured such that, when the UE attaches to the WLAN, the SaMOG performs an authentication/authorization process for the UE with the AAA server. The AAA server can query a Home Subscriber Server (HSS) for a user registration state and location of the UE. The HSS, in turn, can communicate with a Mobility Management Entity (MME) to obtain the current UE location and facilitate offload of the to the private WLAN, which may offer a better user experience to the UE in terms of speed and/or throughput than may be available on the 4G/LTE RAN.

In some instances, a mobile network operator may deploy 3GPP Fifth Generation (5G)/New Radio (NR) WWAN coverage for an area, such as for a large public venue (LPV) (e.g., a stadium, arena, etc.) for hosting events (e.g., cricket, soccer, concerts, etc.). In such network environments, the mobile network operator may want to continue offloading UEs latching on to LTE to a trusted WLAN (e.g., Wi-Fi network) but the mobile network operator may not want to offload UEs latching onto one or more NR bands of the WWAN to the trusted WLAN.

For example, user experience (e.g., throughput, speed, etc.) for UEs latching on to some NR band(s) may be superior to the user experience that may be provided for UEs via the trusted WLAN, and the mobile network operator may not want to impact the user experience of UEs latching onto such NR band(s). However, in some instances, it may be desirable to provide restrictions for one or more band(s) of NR with regard to allowing or not allowing offload to the trusted WLAN.

For example, in some instances, a mobile network operator providing 5G/NR WWAN coverage for the LPV may provide coverage for both a 2.5 Gigahertz (GHz) (i.e., 2500 Megahertz (MHz)) NR radio band (also sometimes referred to as 'spectrum') and a 700 MHz NR radio band and may also provide and trusted WLAN coverage for the LPV.

The offered speed/throughput for the 700 MHz NR radio band may not be as good as what can be provided via the trusted WLAN for the LPV. Thus, in some instances it may be desired by the mobile network operator to restrict some UEs that are latching onto some NR radio band(s) for the LPV from offloading to the trusted WLAN (Wi-Fi), such as UEs latching onto the 2.5 GHz NR radio band, while mandating or requiring that UEs that are latching onto other NR radio band(s), such as the 700 MHz radio band, are to offload to the trusted WLAN. However, there is currently no mechanism in place through which a mobile network operator can mandate that a UE that latches onto a specific NR radio band for the WWAN is to offload to a WLAN (e.g., Wi-Fi) access, while allowing other UEs that latch onto other NR radio band(s) (that are different than the specific NR radio band for which offload is mandated/required) to remain connected to the WWAN.

In accordance with embodiments herein, techniques are provided through which a UE that latches onto a specific NR radio band (e.g., 700 MHz) of a WWAN can be caused to offload to a WLAN access, while all other UEs latching onto other NR bands (e.g., all bands other than 700 MHz) can remain latched onto/connected to the WWAN.

Although embodiments herein are discussed with reference to offload restrictions for 700 MHz and 2.5 GHz NR radio bands, it is to be understood that teachings of the present disclosure can be extended to other radio bands for other RAN/RAT types and/or use cases. For example, in some embodiments, offload restrictions may be configured for wireless broadband access technologies, such as IEEE 802.16 access technologies (e.g., WiMAX).

In another example, in some embodiments offload restrictions may be configured with reference to network slicing use cases, which may be configured in combination with RAN/RAT type restrictions. For example, in some embodiments, UEs attaching to certain 5G/NR radio band(s) via a default network slice may be offloaded to another network slice configured to support other RAN/RAT types, or any variation thereof.

Referring to FIG. 1, FIG. 1 illustrates a system 100 in which location-specific WLAN offload restrictions may be provided for user equipment based on connection of user equipment to one or more WWAN radio bands, according to an example embodiment. In at least one embodiment, system 100 may include a number of user equipment (UE) such as a UE 102A and a UE 102B, a WWAN subsystem 106, and a WLAN subsystem 108 in which the WLAN subsystem 108 may be considered a trusted WLAN subsystem (e.g., trusted Wi-Fi subsystem). Also shown in FIG. 1 are one or more data networks 140 (e.g., the public Internet, an enterprise/private network (e.g., a business entity, a government entity, an education entity, etc. to serve enterprise purposes), an Internet Protocol (IP) Multimedia Subsystem (IMS), an Ethernet network/switching system, and/or the like).

In at least one embodiment, the WWAN subsystem 106 for system 100 may include a WWAN 110 including a WWAN radio node 112, which may be connected to a WWAN network infrastructure 120, such as a 3GPP 5G WWAN network infrastructure, that includes a combined Access and Mobility Management Function (AMF)/Mobility Management Entity (MME), referred to herein as AMF/MME 122, a combined Session Management Function (SMF)/control plane Packet Data Network (PDN) Gateway (PGW-C), referred to herein as SMF/PGW-C 124, a combined User Plane Function (UPF)/user plane PGW (PGW-U) 126, and a combined Unified Data Management (UDM)/Home Subscriber Server (HSS) element, referred to herein as UDM/HSS 128. In some embodiments, UDM/HSS 128 may interface with and/or be implemented with/co-located with a Unified Data Repository (UDR) element, not shown in FIG. 1.

In some discussions herein, the WWAN radio node 112 may be characterized as providing a 3GPP RAN/WWAN. In at least one embodiment, WWAN radio node 112 may be implemented as a 5G next generation Node B (gNodeB or gNB) to facilitate over-the-air (OTA) radio frequency (RF) coverage for 5G/NR radio bands, such as the 2.5 GHz NR radio band and the 700 MHz NR radio band. It is to be understood that other NR radio bands may be provided by WWAN radio node 112 in accordance with embodiments herein.

For the WWAN subsystem 106, WWAN radio node 112 of WWAN 110 may interface with AMF/MME 122 and UPF/PGW-U 126. The AMF/MME 122 may further interface with the SMF/PGW-C 124 and the UDM/HSS 128. The SMF/PGW-C 124 may further interface with the UPF/PGW-U 126 and the UDM/HSS 128. The UPF/PGW-U 126 may further interface with the one or more data networks 140 (e.g., to facilitate data plane communications between one or more UE(s) and the data networks 140).

Network elements of WWAN network infrastructure 120 are represented with respect to 5G core (5GC) and 4G core network elements. It is to be understood that WWAN network infrastructure 120 may also be configured to include other 4G control and user plane separation (CUPS) core network elements, such as any number control plane serving gateways (SGWs) (e.g., SGW-Cs) and user plane PGWs and SGWs (e.g., PGW-Us and SGW-Us) in any appropriate configuration. In some configurations, the WWAN radio node 112 may be implemented as an evolved Node B (eNodeB or eNB).

In at least one embodiment, the WLAN subsystem 108 may include a WLAN 114 that includes a WLAN radio node that may be implemented with and/or interface with a wireless LAN controller (WLC), referred to herein as WLAN radio node/WLC 116, in which the WLAN radio node/WLC 116 may interface with a WLAN network infrastructure 130 that includes a SaMOG gateway 132 and an AAA server 134. In some discussions herein, the WLAN radio node/WLC 116 may be characterized as providing a non-3GPP RAN/WLAN.

For the WLAN subsystem 108, WLAN radio node/WLC 116 of WLAN 114 may interface with SaMOG gateway 132, which may further interface with AAA server 134.

Additionally for system 100, SaMOG gateway 132 of WLAN network infrastructure 130 may further interface with UPF/PGW-U 126 of WWAN network infrastructure 120 such that, for UE(s) connected to the WLAN 114 via WLAN radio node/WLC 116, the UE(s) can perform data plane communications with data networks 140 via communications traversing UPF/PGW-U 126 and SaMOG gateway 132.

Additionally, AAA server 134 of WLAN network infrastructure 130 can further interface with UDM/HSS 128 such that AAA server 134 can facilitate authentication of one or more UE attempting to connect to WLAN 114 in order to provide offload decisions regarding whether one or more UE, such as UE 102A and 102B, are allowed/not allowed or mandated/required to offload to the WLAN 114 from the WWAN 110 in accordance with embodiments herein. As referred to herein and in the claims, AAA server 134 can be referred to as an 'authentication server'. In at least one embodiment, AAA server 134 may be implemented as a Cisco® Prime Access Registrar (CPAR). Cisco® is a registered trademark of Cisco Systems, Inc.

It is to be understood that the RF coverage areas for each of WWAN 110 and WLAN 114 can overlap in any manner to facilitate 3GPP and non-3GPP RF coverage areas for system 100 such that UE 102A and UE 102B may, depending on various offload restrictions as discussed for various embodiments herein, be capable of connecting to WWAN 110 and/or WLAN 114. The size/shape of each of WWAN 110 and WLAN 114 is provided for illustrative purposes only and is not meant to limit the broad scope of embodiments herein.

A Radio Access Technology (RAT)/Frequency Selection Priority (RFSP) index is a subscription parameter that can be stored in the UDM/HSS 128 (and UDR (not shown)) that is used to store subscription information for UEs/users operating UEs, such as for users operating UE 102A and UE 102B. Conventionally, a 3GPP 5G radio node, such as a gNodeB makes use of an RFSP index for radio resource management such that the mobile core network can use the RFSP index for a UE to direct the UE to latch on to/connect to some specific band as well (e.g., to redirect a UE from LTE to NR and/or vice-versa).

In accordance with embodiments herein, system 100 can be enhanced to use the RFSP index for a UE or, more specifically, the RFSP index identified for the UE within subscription information for the user/UE stored within UDM/HSS 128, in order to authorize or not authorize an offload decision regarding WLAN/Wi-Fi offload for the UE.

As shown in FIG. 1, consider that WWAN radio node 112 is configured to provide 5G/NR RF coverage for the 700 MHz NR radio band, which can be identified using RFSP index 1 (RFSP 1), and is configured to provide 5G/NR RF coverage for the 2.5 GHz NR radio band, which can be identifying using RFSP index 2 (RFSP 2). Further consider that WWAN radio node 112 is associated with a Tracking Area Identity (TAI) 111 for WWAN 110.

Broadly, various operations may be facilitated by system 100 to support restricting (or not allowing) UEs that are latching onto some NR radio bands of WWAN 110 at a particular location of the WWAN 110 (e.g., TAI), such as the 2.5 GHz NR radio band at a particular location of the WWAN 110 (e.g., for TAI 111 of the WWAN 110), from offloading to WLAN 114, while mandating that UEs that are latching onto the WWAN 110 using one or more other specific NR bands at the particular location, such as the 700 MHz NR radio band at the particular location, are to be offloaded to the WLAN 114.

Stated differently, operations provided by system 100 may facilitate requiring or mandating that UEs that are latching onto a specific NR radio band of the WWAN 110 at a particular location (e.g., TAI) of the WWAN 110, such as the 700 MHz NR radio band (or multiple specific bands, if configured), are mandated to offload to the WLAN 114, while all other UEs that are latching onto other NR radio bands of the WWAN 110 that are not specifically configured 'offload mandated/required' radio band(s) at the particular location, such as the 2.5 GHz NR radio band at the particular location, can remain connected to the WWAN 110 and not be offloaded to the WLAN 114.

In various embodiments, a particular location of WWAN 110 at which different offloading restrictions may be enforced may be identified using any appropriate identifier of UE location, such as a corresponding tracking area (e.g., identified by a Tracking Area Identity (TAI)), a routing area (e.g., identified via a Routing Area Identifier (RAI)), any other appropriate identifier of UE location (e.g., an identifier of the WWAN radio node with which the UE is connected, such as a New Radio (NR) Cell Global Identifier (NCGI), any User Location Information (ULI) attribute that may be reported by a UE, etc.), combinations thereof, and/or the like. Various example operations discussed herein, below, are discussed with reference to utilizing a TAI as an indication of UE location within WWAN 110, however, it is to be understood that any location information may be utilized in accordance with embodiments herein in order to determine/enforce offload restrictions for a mobile network environment.

The determination or decision regarding whether or not a UE is or is not to be offloaded from the WWAN 110 to the WLAN 114 can be performed by AAA server 134 (e.g., authentication server) during an authentication process that can be performed when the UE seeks to connect to the WLAN 114. The offload decision performed by the AAA server 134 (e.g., authentication server) can be based on a local offload configuration provided for the AAA server 134 in combination with information obtained from the WWAN network infrastructure 120 that indicates a location of the UE within the WWAN 110 (e.g., a location indicator for the UE within the WWAN 110) and also the NR radio band to which the UE is latched on to/connected to within the WWAN 110.

As discussed in further detail below, the offload configuration provided for the AAA server 134 can identify locations of WWAN 110 (e.g., based on TAI, etc.) for which WLAN offload is allowed or not allowed and can also identify NR radio band(s) of WWAN 110 for which WLAN offload is allowed or not allowed in which the NR radio band(s) for which offload is allowed/mandated or not allowed can be identified based on RFSP index numbers.

The information regarding the UE connection in the WWAN 110 can be obtained by the AAA server 134 from a subscription data management element of the WWAN network infrastructure 120, such as the UDM/HSS 128 of the WWAN network infrastructure 120, which maintains subscription data for UEs of the system 100, such as UE 102A and UE 102B.

Among other subscription information maintained for each UE 102A and 102B, the subscription data maintained by the UDM/HSS 128 (e.g., subscription data management element) may identify a 5G/NR radio band of the WWAN 110 through which each of UE 102A and UE 102B is subscribed in order to latch on to the WWAN 110 in order to perform a registration/connection with WWAN 110 and WWAN network infrastructure 120.

The 5G/NR radio band of the WWAN 110 that each of UE 102A and UE 102B is authorized to latch on can be identified via a corresponding RFSP index stored for each UE in the subscription data for of UE 102A and 102B maintained by the UDM/HSS 128 (e.g., indicating RFSP index 1 (RFSP 1) if a UE is subscribed to connect to the 700 MHz NR radio band or indicating RFSP index 2 (RFSP 2) if a UE is subscribed to connect to the 2.5 GHz NR radio band).

During operation, the location indicator for a given UE indicting the location of the UE within the WWAN 110 (e.g., TAI, etc.) can be obtained by the UDM/HSS 128 from the AMF/MME 122 and an NR radio band indicator identifying the NR radio band to which the UE is connected in the WWAN 110 (e.g., RFSP index to which the UE is subscribed/connected) can be identified within subscription information maintained for the UE by the UDM/HSS 128. The UDM/HSS 128 can provide to the AAA server 134 both of the location indicator for a given UE seeking connection to the WLAN 114 and also the NR radio band indicator for the UE indicating the NR radio band of the WWAN 110 to which the UE is currently connected.

Upon obtaining the location indicator for the given UE and the NR radio band indicator for the UE, the AAA server 134 can evaluate the local offload configuration information to determine whether the UE is allowed or mandated to offload to the WLAN 114 or if the UE is not allowed to offload to the WLAN.

Various example details associated with operations that may be provided via system 100 to facilitate location-specific WLAN offload restrictions for one or more UEs are discussed in further detail, below.

Figure 2A:
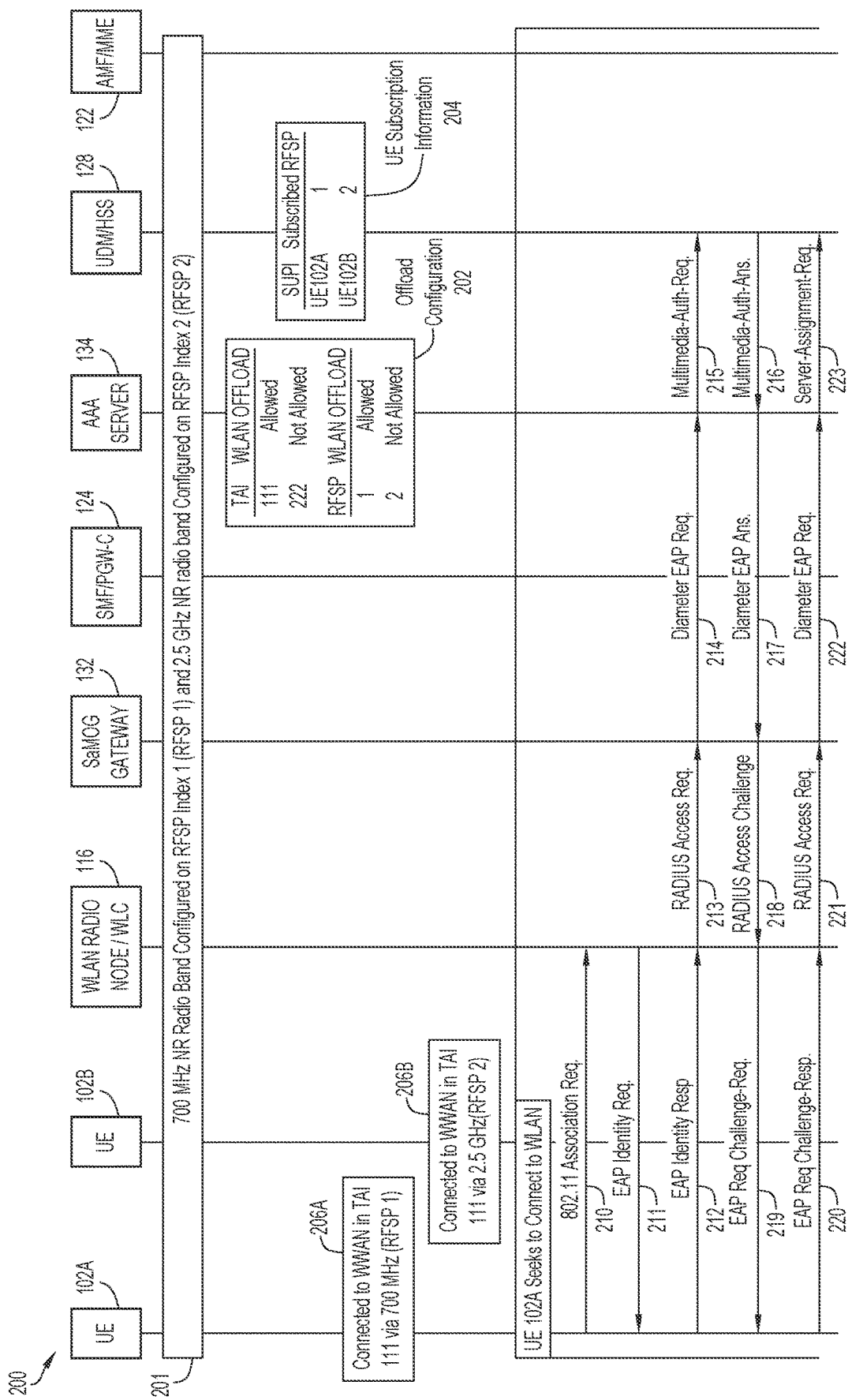
FIGS. 2A, 2B, and 2C are a message sequence diagram illustrating various example operations that may be performed to facilitate location-specific WLAN offload restrictions for user equipment based on one or more WWAN radio bands, according to an example embodiment.
Figure 2B:
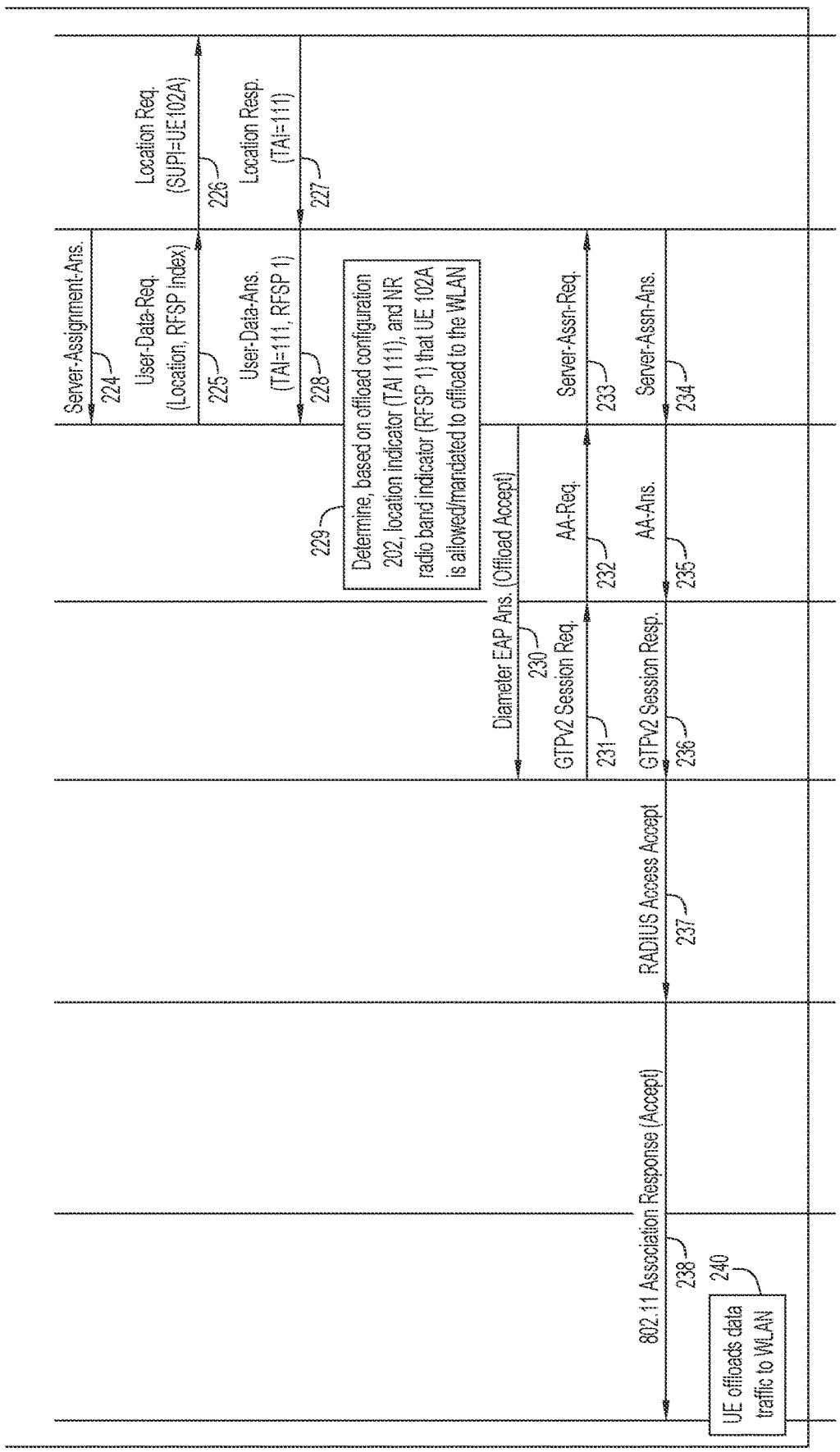

For example, with reference to FIGS. 2A and 2B, which are a message sequence diagram 200, consider various example operations that may be performed via system 100 of FIG. 1 in order to facilitate location-specific WLAN offload restrictions for user equipment based on connection of user equipment to one or more WWAN radio bands, according to an example embodiment.

Figure 2C:
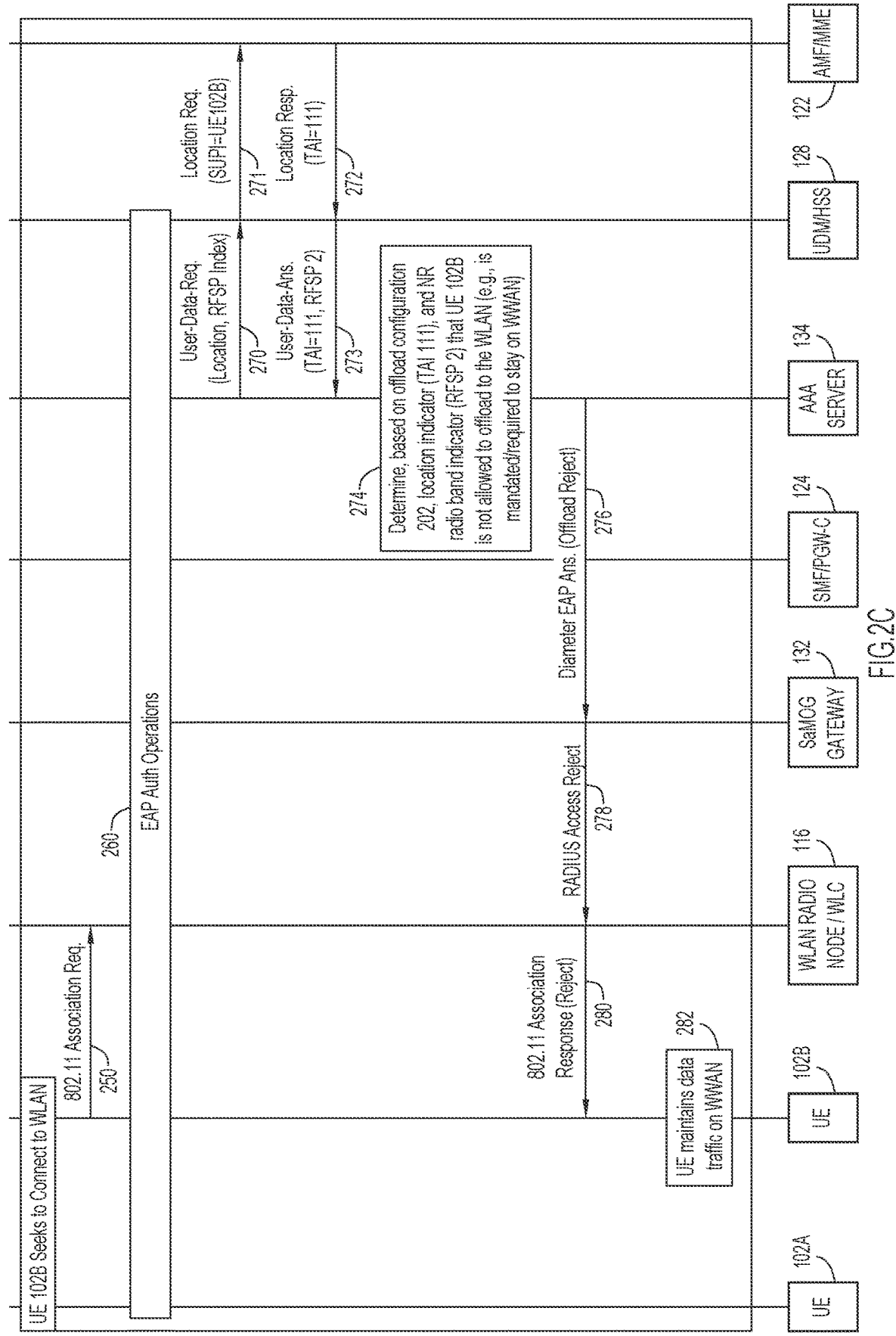

FIGS. 2A, 2B, and 2C include UE 102A, UE 102B, WLAN radio node/WLC 116, AMF/MME 122, SMF/PGW-C 124, UDM/HSS 128, SaMOG gateway 132, and AAA server 134 (e.g., authentication server). WWAN radio node 112 of WWAN 110 is not shown in FIGS. 2A and 2B, however, various operations discussed for FIGS. 2A, 2B, and 2C may refer to WWAN radio node 112 and/or WWAN 110 as shown in FIG. 1. For example, as shown in FIG. 2A at 201, consider, as discussed above for FIG. 1, that the mobile network operator of system 100 has configured the 700 MHz NR radio band on RFSP index 1 (RFSP 1) and has configured the 2.5 GHz NR radio band on RFSP index 2 (RFSP 2), the RF coverage for both of which are provided for WWAN 110 via WWAN radio node 112. UE 102B is not shown in FIGS. 2A and 2B, however, UE 102B may be referenced for various discussions involving FIGS. 2A and 2B.

Further as shown in FIG. 2A, an offload configuration 202 can be provided for AAA server 134 (e.g., by a network administrator, by pulling/obtaining the configuration from a policy server, etc.) in which the offload configuration identifies locations of WWAN 110 for which WLAN offload is allowed or not allowed and also identifies NR radio band(s) of WWAN 110 for which WLAN offload is allowed or not allowed in which the NR radio band(s) for which offload is allowed/mandated or not allowed are identified based on RFSP index numbers (e.g., as discussed above and as shown in FIG. 2A).

For example, the offload configuration 202 for the embodiment of FIGS. 2A, 2B, and 2C may indicate that WLAN offload is allowed for a first location of WWAN 110, such as for TAI 111, and WLAN offload is not allowed for a second location of WWAN 110, such as for a TAI 222. Further, the offload configuration may identify that WLAN offload is allowed or mandated/required for RFSP 1 (700 MHz, in this example) and WLAN offload is not allowed for RFSP 2 (2.5 GHz, in this example). The combination of both the location information (TAI) and the NR radio band information (RFSP) are to be considered by the AAA server 134 for WLAN offload decisions/enforcing WLAN offload restrictions involving UE that may be present within system 100, such as UE 102A and 102B that may connect to WWAN 110 and seek offload to WLAN 114.

Further as shown in FIG. 2A, consider that (WWAN) subscription data 204 for UE 102A (and UE 102B) is maintained by UDM/HSS 128 in which the subscription information identifies each UE by a corresponding UE identifier, such as a Subscription Permanent Identifier (SUPI) in which the SUPI for UE 102A is identified as 'SUPI=UE102A' and the SUPI for UE 102B is identified as 'SUPI=UE102B', and the subscription data 204 further identifies a 5G/NR radio band of the WWAN 110 through which each of UE 102A and UE 102B is authorized to latch on in order to perform a registration/connection with WWAN 110 and WWAN network infrastructure 120. Although a SUPI for UEs is discussed for the example operations of FIGS. 2A, 2B, and 2C it is to be understood that other UE identifiers may be utilized to identify UEs, such as International Mobile Subscriber Identifiers (IMSIs) for 4G/LTE identifiers, or the like.

Thus, through the subscription data 204, it can be determined that, if connected to WWAN 110/WWAN network infrastructure 120, each UE will be connected via the specific 5G/NR radio band that is allowed per each UE's subscription information (and not some other, different 5G/NR radio band).

As shown at 206A, consider for the present example that UE 102A is connected to WWAN 110/WWAN radio node 112 (and WWAN network infrastructure 120) in TAI 111 and is registered on the 700 MHz NR radio band, as specified per the subscription data 204 configured for UDM/HSS 128 (RFSP index 1 (for the 700 MHz NR radio band)). Further, as shown at 206B, consider for the present example that UE 102B is connected to WWAN 110/WWAN radio node 112 (and WWAN network infrastructure 120) in TAI 111 and is registered on the 2.5 GHz NR radio band, as specified per the subscription data 204 configured for UDM/HSS 128 (RFSP index 2 (for the 2.5 GHz NR radio band)).

Consider various example WLAN offload decision operations that may be performed via AAA server 134 for a scenario in which UE 102A seeks to connect to and offload to WLAN 114, in accordance with embodiments herein. For example, as shown at 210, consider that UE 102A, which is connected to WWAN 110 via the 700 MHz NR radio band, seeks to connect to the WLAN 114 such that UE 102A sends an 802.11 association request to WLAN radio node/WLC 116.

Receiving the 802.11 association request triggers an Extensible Authentication Protocol (EAP) authentication procedure (e.g., 802.1x EAP authentication procedure, etc.) to be performed for UE 102A, which involves various communications/operations, such as sending an EAP identity request (req.) message to UE 102A, as shown at 211, to which the UE 102A responds with an EAP identity response message, as shown at 212. Thereafter, standards-based EAP 802.1 authentication procedures are performed, as shown at 213 involving sending a Remote Authentication Dial-In User Service (RADIUS) access request to SaMOG gateway 132 by the WLAN radio node/WLC 116, which triggers the SaMOG gateway to perform an authentication/authorization for the UE 102A connection with the WLAN 114 via the AAA server 134 such that the SaMOG gateway 132 sends a Diameter EAP request to AAA server 134 at 214, thereby triggering the AAA server 134 to send a Multimedia-Authentication-Request (MAR) to the UDM/HSS 128, as shown at 215.

The UDM/HSS 128 can respond to the MAR with a Multimedia-Authentication-Answer (MAA), as shown at 216, which triggers a Diameter EAP answer (ans.) to be sent from the AAA server 134 back to the SaMOG gateway, as shown at 217. Thereafter, the SaMOG gateway 132 generates and sends a RADIUS access challenge message, as shown at 218, to WLAN radio node/WLC 116, which triggers an EAP request challenge request message to be sent to the UE 102A, as shown at 219.

The UE 102A can respond to the challenge request with an EAP request challenge response message that is sent to the WLAN radio node/WLC 116, as shown at 220, which triggers the WLAN radio node/WLC 116 to send a RADIUS access request message to the SaMOG gateway 132, as shown at 221, which triggers the SaMOG gateway 132 to send a Diameter EAP request message to the AAA server 134, as shown at 222, which triggers the AAA server 134 to send a Server-Assignment-Request (SAR) to the UDM/HSS 128, as shown at 223, to which the UDM/HSS 128 responds with a Server-Assignment-Answer (SAA) message, as shown at 224 in FIG. 2B.

Thereafter, as shown at 225, the AAA server 134 sends a User-Data-Request (UDR) message to UDM/HSS 128 to query the UDM/HSS 128 in order to obtain an indication of the location of UE 102A (e.g., a location indicator for UE 102A) with WWAN 110 and to obtain an indication of the NR radio band to which UE 102A is connected via the WWAN 110 (e.g., an NR radio band indicator for the UE). Although not shown in FIG. 2B, the UDR at 225 may also include the SUPI for UE 102A (e.g., SUPI=UE102A) and/or any other identifying information for identifying UE 102A/the subscriber associated therewith for the request. In accordance with embodiments herein, the UDR sent at 225 can be overloaded to indicate that the UDR sent by the AAA server 134 is further to obtain an indication of the NR radio band to which the UE 102A is connected via the WWAN 110 (e.g., an NR radio band indicator for the UE), as can be specified via the corresponding RFSP index identified for the UE 102A maintained via the subscription data 204 stored for UE 102A by UDM/HSS 128 (e.g., SUPI=UE102A): RFSP 1). In various embodiments, the UDR can be overloaded using any Attribute-Value-Pair (AVP) object, Information Element (IE), etc. that may be used to indicate that the AAA server 134 seeks to obtain an indication of the NR radio band to which UE 102A is connected.

Upon obtaining the UDR from the AAA server 134, the UDM/HSS 128 determines that UE 102A is registered to the WWAN 110 and queries the AMF/MME 122 to identify the location of the UE 102A within WWAN 110, via a location request, as shown at 226. The location request may identify the SUPI of UE 102A (or any other appropriate identifier for UE 102A) in the request. In response to the request, the AMF/MME 122 can perform a lookup via internally maintained connection information for the UE 102A (that is registered with/to WWAN 110) in order to identify that the UE 102A is connected to WWAN 110 in TAI 111 and send a location response message to the UDM/HSS 128, as shown at 227, identifying TAI=111 for the location of the UE 102A within the WWAN 110. In at least on embodiment, the location request message sent at 226 may be a 3GPP 'Nam_Location_provide_location_info' request message and the location response message sent at 227 may be a 3GPP 'Nam_Location_provide_location_info' response message.

Upon obtaining the location indicator for UE 102A (e.g., TAI=111), the UDM/HSS 128 can generate and send a User-Data-Answer (UDA) message to the AAA server 134, as shown at 228, that includes the location indicator for UE 102A (e.g., TAI=111) and is overloaded to also include the NR radio band indicator for the UE 102A (e.g., RFSP 1) that identifies the NR radio band of the WWAN 110 to which the UE 102A is connected. Although not shown in FIG. 2B, the UDA at 228 may also include the SUPI for UE 102A (e.g., SUPI=UE102A) and/or any other identifying information for identifying UE 102A/the subscriber associated therewith for the answer message.

Upon obtaining the UDA message, the AAA server 134 can, as generally shown at 229, evaluate the information contained in the offload configuration 202 to determine whether the UE 102A is allowed or mandated to offload to the WLAN 114 or if the UE 102A is not allowed to offload to the WLAN. For the present example, the AAA server 134 determines that UE 102A is allowed or mandated/required to offload to the WLAN 114, based on evaluating the offload configuration 202 (TAI 111: Allowed and RFSP 1: Allowed) with regard to the location indicator for UE 102A indicating that the UE 102A is within TAI 111 and the NR radio band indicator for UE 102A identifying that the UE 102A is connected to the 700 MHz NR radio band (RFSP 1) for WWAN 110. Thus, in this example use case, UE 102A is mandated to offload to WLAN 114 and is not allowed to remain connected to WWAN 110 per offload configuration 202.

Moving to FIG. 2B, upon determining that the UE 102A is to be offloaded to the WLAN 114, AAA server 134 can perform operations to facilitate the offload of UE 102A to the WLAN 114. For example, as shown at 230, AAA server 134 can send an authorization success indication to SaMOG 132 that UE 102A is allowed to offload to the WLAN 114 by generating and sending a Diameter EAP answer (in response to the Diameter EAP request received at 214) to SaMOG gateway 132, as shown at 230, that indicates that the UE 102A is authorized to offload to the WLAN 114 (e.g., including an Offload Accept indication), which triggers the SaMOG gateway 132 to send a GTPv2 (General Packet Radio Service (GPRS) Tunneling Protocol version 2) session request message to the SMF/PGW-C 124, as shown at 231 (e.g., to establish a protocol data unit (PDU) session for the UE 102A via UPF/PGW-U 126 (not shown in FIGS. 2A and 2B).

Upon receiving the session request message, the SMF/PGW-C 124 sends an AA-Request (AAR) message to the AAA server 134, as shown at 232, which triggers another SAR message to be sent from the AAA server 134 to the UDM/HSS 128, as shown at 233, and an SAA to be sent in response back to the AAA server 134 (authorizing the session), as shown at 234, which triggers the AAA server 134 to send AA-Answer message to the SMF/PGW-C 124, as shown at 235. Thereafter, the SMF/PGW-C 124 sends a GTPv2 session response message to the SaMOG gateway 132, as shown at 236, to authorizing the session.

Upon receiving the session authorization, the SaMOG gateway 132 is triggered to send a RADIUS access accept message to the WLAN radio node/WLC 116, as shown at 237, which triggers the WLAN radio node/WLC 116 to send an 802.11 association response message to the UE 102A, as shown at 238, indicating the WLAN 114 association/connection (offload to the WLAN 114) is accepted, thereby facilitating offload of the UE 102A from the WWAN 110 to the WLAN 114 such that, as shown at 240, the UE 102A offloads its data traffic to the WLAN 114 in which the data traffic traverses WLAN radio node/WLC 116, SaMOG gateway 132, and UPF/PGW-U 126 for communications between the UE 102A and data networks 140, per standards-based operations.

Further, as shown in FIG. 2C, consider various WLAN offload decision operations that may be performed via AAA server 134 for a scenario in which UE 102B seeks to connect to and offload to WLAN 114, in accordance with embodiments herein. For example, as shown at 250, consider that UE 102B, which is connected to WWAN 110 via the 2.5 GHz NR radio band, seeks to connect to the WLAN 114 such that an 802.11 association request is sent to WLAN radio node/WLC 116. Thereafter, various EAP authentication operations can be performed, as generally shown at 260, similar to the operations discussed for FIG. 2A at 211, 212, 213, 214, 215, 216, 217, 218, 219, 220, 221, 222, 223, and 224, but with respect to UE 102B rather than UE 102A.

Following the EAP authentication operations (260), AAA server 134 can send a UDR message to the UDM/HSS 128 to query the UDM/HSS 128, as shown at 270, in order to obtain an indication of the location of UE 102B (e.g., a location indicator for UE 102B) with WWAN 110 in which the UDR is overloaded to further indicate that the query is to obtain an indication of the NR radio band to which the UE 102B is connected via the WWAN 110 (e.g., an NR radio band indicator for the UE), as can be specified via the corresponding RFSP index identified for the UE 102B maintained via the subscription data 204 stored for UE 102B by UDM/HSS 128 (e.g., SUPI (UE102B): RFSP 2). Although not shown in FIG. 2C, the UDR at 270 may also include the SUPI for UE 102B (e.g., SUPI=UE102B) and/or any other identifying information for identifying UE 102B/the subscriber associated therewith for the request.

Upon obtaining the UDR from the AAA server 134, the UDM/HSS 128 determines that UE 102B is registered to the WWAN 110 and queries the AMF/MME 122 (e.g., a mobility management node) to identify the location of the UE 102B within WWAN 110, via a location request, as shown at 271 (SUPI=UE102B). In response to the request, the AMF/MME 122 can perform a lookup via internally maintained connection information for the UE 102B in order to identify that the UE 102B is connected to WWAN 110 in TAI 111 and send a location response message to the UDM/HSS 128, as shown at 272, identifying the TAI=111 for the location of the UE 102B within the WWAN 110.

Upon obtaining the location indicator for UE 102B (e.g., TAI=111), the UDM/HSS 128 can generate and send a UDA message to the AAA server 134, as shown at 273, that includes the location indicator for UE 102B (e.g., TAI=111) and is overloaded to also include the NR radio band indicator for the UE 102B (e.g., RFSP 2) that identifies the NR radio band of the WWAN 110 to which the UE 102B is connected. Although not shown in FIG. 2B, the UDA at 273 may also include the SUPI for UE 102B (e.g., SUPI=UE102B) and/or any other identifying information for identifying UE 102B/the subscriber associated therewith for the answer message.

Upon obtaining the UDA message, the AAA server 134 can, as generally shown at 274, evaluate the information contained in the offload configuration 202 to determine whether the UE 102B is allowed or mandated to offload to the WLAN 114 or if the UE 102B is not allowed to offload to the WLAN. For the present example, the AAA server 134 determines that UE 102B is not allowed to offload to WLAN 114, based on evaluating the offload configuration 202 (TAI 111: Allowed and RFSP 2: Not Allowed) with regard to the location indicator for UE 102B indicating that the UE 102B is within TAI 111 and the NR radio band indicator for UE 102B identifying that UE 102B is connected to the 2.5 GHz NR radio band (RFSP 2) for WWAN 110.

Thus, in this example use case, UE 102B is mandated to stay connected to WWAN 110 and is not allowed to offload to WLAN 114 per the offload configuration 202 provided for the AAA server 134. Accordingly, in the example use case involving UE 102B, AAA server 134 rejects authentication/authorization for UE 102B to connect to WLAN 114, which triggers AAA server 134 to send a Diameter EAP answer to SaMOG gateway 132 indicating that the UE 102B is not authorized to offload to the WLAN 114 (e.g., including an Offload Reject indication), as shown at 276. Thereafter, SaMOG gateway 132 sends a RADIUS access reject message to WLAN radio node/WLC 116, as shown at 278, which triggers the WLAN radio node/WLC 116 to send an 802.11 association response to UE 102B, as shown at 280, indicating the WLAN 114 association/connection (offload to the WLAN 114) is rejected.

As shown at 282, UE 102B maintains its data traffic on the WWAN 110 and does not offload to WLAN 114.

Accordingly, for the example operations as illustrated via FIGS. 2A and 2B, AAA server 134 can authorize offload from WWAN 110 to WLAN 114 for allowed RFSP Index(es) (e.g., the 700 MHz NR radio band, in this case) for a given location of the WWAN 110 (e.g., TAI=111) and can reject authorization for all other UEs that are connected to the WWAN 110 using NR radio bands other than the 700 MHz NR radio band.

Thus, broadly in accordance with embodiments herein, a WLAN authentication server, such as AAA server 134, can facilitate authorizing or not authorizing offload from a WWAN to the WLAN for various location-specific WLAN offload restrictions based on an NR radio band of the WWAN to which one or more UE are connected in which the offload restrictions can be identified via a local offload configuration that can be provided for the WLAN authentication server. Based on information obtained for a given UE from a subscription data management element of the WWAN, such as UDM/HSS 128, that indicates a location of the UE within the WWAN and that indicates the NR radio band to which the UE is connected, the WLAN authentication server can evaluate the local offload configuration to determine whether the UE is allowed or mandated to offload to the WLAN or whether the UE is not allowed to offload to the WLAN (and, thus, is mandated to remain connected on the WWAN).

Figure 3:
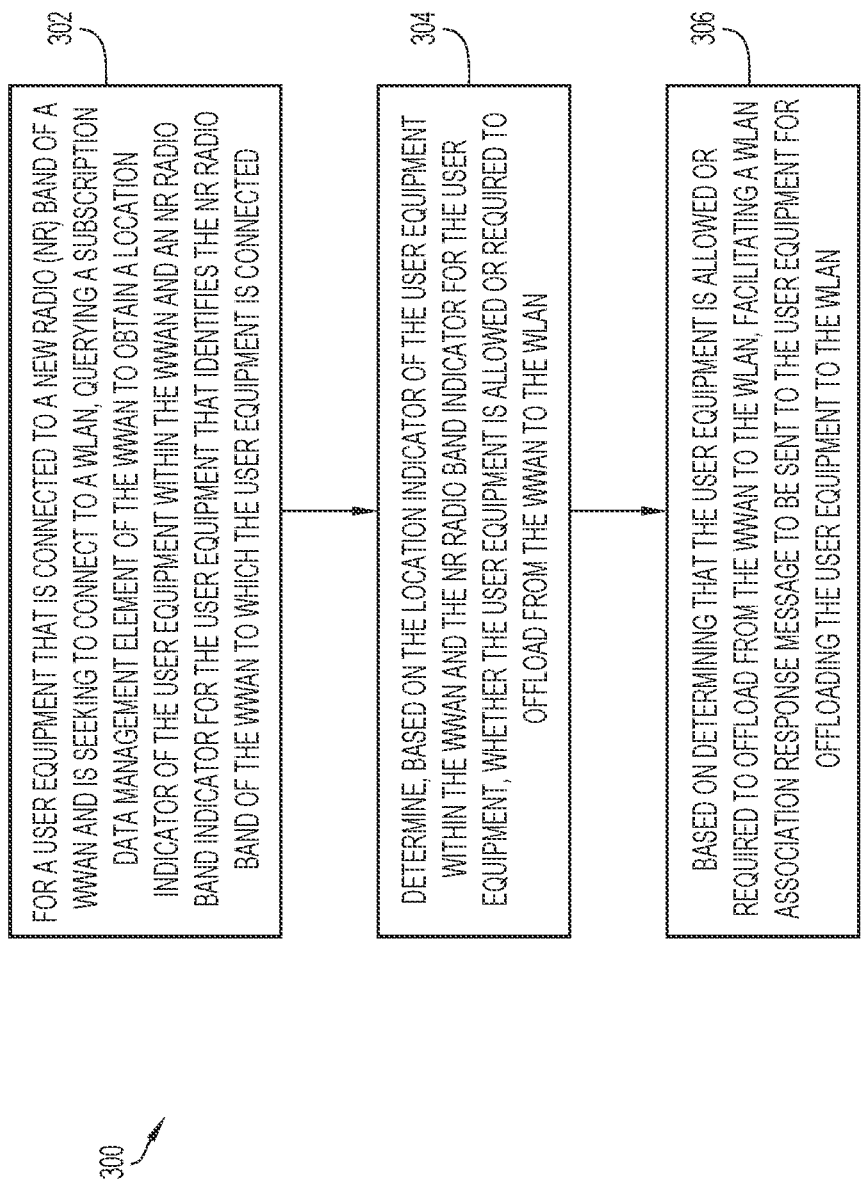
FIG. 3 is a flow chart depicting a method according to an example embodiment.

Referring to FIG. 3, FIG. 3 is a flow chart depicting a method 300 according to an example embodiment. In at least one embodiment, method 300 is associated with operations that may be performed to facilitate location-specific WLAN offload restrictions for user equipment based on connection of user equipment to one or more WWAN radio bands, according to an example embodiment. In at least one embodiment, method 300 may be performed by an authentication server of a WLAN, such as AAA server 134, as shown in FIGS. 1, 2A, and 2B.

At 302, the method may include, for a user equipment that is connected to a NR radio band of a WWAN and is seeking to connect to a WLAN, querying a subscription data management element of the WWAN (e.g., UDM/HSS 128 within WWAN network infrastructure 120 of WWAN subsystem 106 including the WWAN 110) to obtain a location indicator of the user equipment within the WWAN and an NR radio band indicator for the user equipment that identifies the NR radio band of the WWAN to which the user equipment is connected.

The NR radio band indicator for the user equipment may be a Radio Access Technology (RAT)/Frequency Selection Priority (RFSP) index that identifies the NR radio band of the WWAN to which the user equipment is connected. In at least one embodiment, the querying includes the authentication server sending a User-Data-Request (UDR) message to the subscription data management element of the WWAN identifying: that authentication server seeks to obtain the location indicator of the user equipment within the WWAN, and that the authentication server seeks to obtain the RFSP index that identifies the NR radio band to which the user equipment is connected. The location indicator of the user equipment within the WWAN can be provided to the subscription data management element of the WWAN (e.g., UDM/HSS 128 within WWAN network infrastructure 120 of WWAN subsystem 106 including the WWAN 110) by a mobility management node of the WWAN (e.g., AMF/MME 122).

The authentication server can obtain a User-Data-Answer (UDA) message from the subscription data management element that includes the location indicator of the user equipment within the WWAN and the RFSP index that identifies the NR radio band to which the user equipment is connected. The location indicator of the user equipment within the WWAN may be a TAI associated with a WWAN radio node to which the user equipment is connected.

At 304, the method may include determining based on the location indicator of the user equipment within the WWAN and the NR radio band indicator for the user equipment whether the user equipment is allowed or required to offload from the WWAN to the WLAN. For example, the authentication server may include an offload configuration that identifies one or more locations of the WWAN for which offload is allowed from the WWAN to the WLAN; one or more locations of the WWAN for which offload is not allowed from the WWAN to the WLAN; one or more NR radio bands for which offload is allowed from the WWAN to the WLAN; and one or more NR radio bands for which offload is not allowed from the WWAN to the WLAN such that the determining at 304 can be based on evaluating the offload configuration in relation to the location indicator of the user equipment within the WWAN and the NR radio band indicator for the user equipment in order to determine whether the user equipment is allowed or required to offload from the WWAN to the WLAN.

In at least one embodiment, the offload configuration may identify that offload to the WLAN is not allowed for a 2.5 GHz NR radio band at a particular location (e.g., a particular TAI) of the WWAN and may identify that offload to the WLAN is allowed for a 700 MHz NR radio band at the particular location of the WWAN.

At 306, the method may include based on determining that the user equipment is allowed or required to offload from the WWAN to the WLAN, facilitating a WLAN association response message to be sent to the user equipment for offloading the user equipment to the WLAN (e.g., sending an 802.11 association response to the user equipment indication that the 802.11 association/connection to the WLAN is accepted or allowed).

For example, the authentication server can trigger session establishment for the user equipment to be performed via a mobility gateway of the WLAN (e.g., SaMOG gateway 132) in coordination with a session management node of the WWAN (e.g., SMF/PGW-C 124), the authentication server of the WLAN, and the subscriber data management element of the WWAN such that, upon establishment of the session for the user equipment, a RADIUS access accept can be sent from the mobility gateway of the WLAN, which triggers the WLAN association response (e.g., an 802.11 association response indicating the association is accepted or allowed) to be sent to the user equipment from a WLAN radio node/WLC of the WLAN indicating that connection (e.g., offload) to the WLAN is accepted or allowed).

Although certain embodiments herein are discussed with reference to 5G/NR to WLAN offload scenarios, it is to be understood that embodiments of the present disclosure can be extended to facilitate enforcing policy for access restriction(s) from any 3GPP RAT or non-3GPP RAT in general. Thus, the techniques herein enable the ability to provide a control mechanism for a mobile network operator to dynamically prioritize offload capabilities from any of a "Primary Access" to any of a "Secondary Access". In many scenarios (given cost of spectrum) the secondary access may be unlicensed spectrum, however, the use of RFSP indexes for enforcing/determining offload determinations can be extended to encompass other offload priorities that may be used to control such offload to a secondary access that may provide improved experience to preferred users (when applicable) when offload is leveraged. Further, such offload restrictions may not be restricted to any specific frequency bands.

While traditional offload has been to prioritize data only scenarios, techniques proposed herein may also be utilized to enhance voice scenarios (e.g., to leverage the proposed RFSP index in order to identify voice over Wi-Fi (VoWiFi) or any combination of data, voice, and/or any other Access Traffic, Steering, Switching, and Splitting (ATSSS) handover priorities/mechanisms/scenarios.

Figure 4:
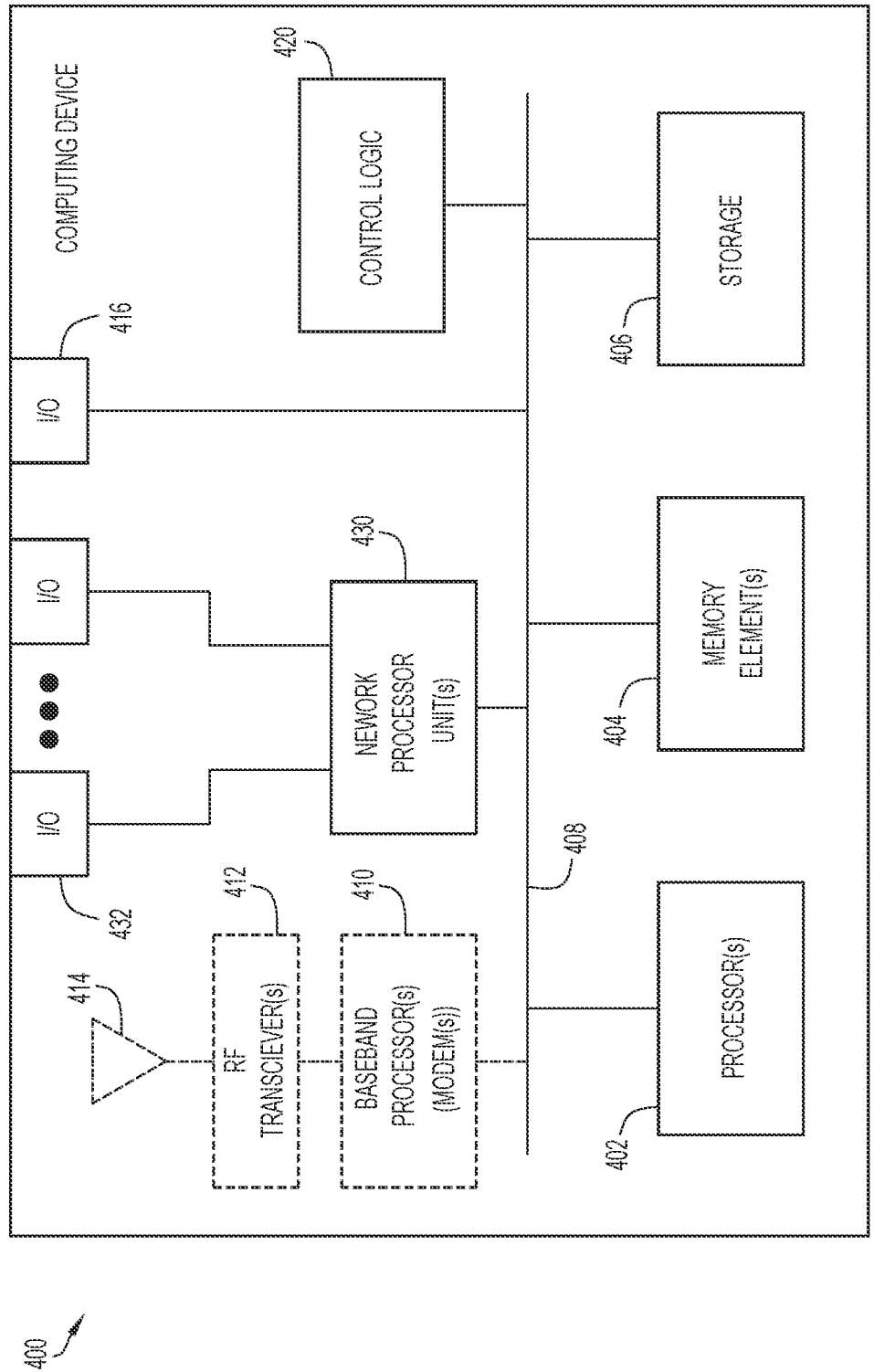
FIG. 4 illustrates a hardware block diagram of a computing device configured to perform functions associated with operations discussed in connection with embodiments herein.

Referring to FIG. 4, FIG. 4 illustrates a hardware block diagram of a computing device 400 that may perform functions associated with operations discussed herein in connection with the techniques described for embodiments herein. In various embodiments, a computing device or apparatus, such as computing device 400 or any combination of computing devices 400, may be configured as any entity/entities in order to perform operations of the various techniques discussed for embodiments herein.

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein.

For embodiments in which computing device 400 may be implemented as any device capable of wireless communications, computing device 400 may further include at least one baseband processor or modem 410, one or more radio RF transceiver(s) 412 (e.g., any combination of RF receiver(s) and RF transmitter(s)), one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may be performed by an authentication server of a WLAN that may include for a user equipment that is connected to a New Radio (NR) radio band of a wireless wide area network (WWAN) and is seeking to connect to the WLAN, querying a subscription data management element of the WWAN to obtain a location indicator of the user equipment within the WWAN and an NR radio band indicator for the user equipment that identifies the NR radio band of the WWAN to which the user equipment is connected; determining, based on the location indicator of the user equipment within the WWAN and the NR radio band indicator for the user equipment, whether the user equipment is allowed or required to offload from the WWAN to the WLAN; and based on determining that the user equipment is allowed or required to offload from the WWAN to the WLAN, facilitating a WLAN association response message to be sent to the user equipment for offloading the user equipment to the WLAN.

In at least one instance, the NR radio band indicator for the user equipment is a Radio Access Technology (RAT)/Frequency Selection Priority (RFSP) index that identifies the NR radio band of the WWAN to which the user equipment is connected. In at least one instance, the querying includes sending a User-Data-Request (UDR) message to the subscription data management element of the WWAN identifying: that authentication server seeks to obtain the location indicator of the user equipment within the WWAN; and that the authentication server seeks to obtain the RFSP index that identifies the NR radio band to which the user equipment is connected.

In at least one instance, the location indicator of the user equipment within the WWAN is provided by a mobility management node of the WWAN. In at least one instance, the authentication server obtains a User-Data-Answer (UDA) message from the subscription data management element that includes the location indicator of the user equipment within the WWAN and the RFSP index that identifies the NR radio band to which the user equipment is connected. In at least one instance, the location indicator of the user equipment within the WWAN is a Tracking Area Identity (TAI) associated with a WWAN radio node to which the user equipment is connected.

In at least one instance, the authentication server of the WLAN includes an offload configuration that identifies: at least one of: one or more locations of the WWAN for which offload is allowed from the WWAN to the WLAN; or one or more locations of the WWAN for which offload is not allowed from the WWAN to the WLAN; one or more NR radio bands for which offload is allowed from the WWAN to the WLAN; and one or more NR radio bands for which offload is not allowed from the WWAN to the WLAN.

In at least one instance, the offload configuration identifies that offload is not allowed for a 2.5 GHz NR radio band at a particular location of the WWAN and identifies that offload is allowed or required for a 700 MHz NR radio band at the particular location of the WWAN. In at least one instance, the subscription data management element of the WWAN is a Unified Data Management (UDM) element.

Variations and Implementations

It is to be understood that the network functions/elements as illustrated for WWAN subsystem 106 and the WLAN subsystem 108 of FIG. 1 are provided for illustrative purposes only and are not meant to limit the broad scope of embodiments herein. Other network functions can be provided for each core network in accordance with any appropriate core network standards, such as 3GPP standards, IEEE 801.11 standards, Wireless Broadband Alliance (WBA) standards, and/or the like.

Generally, per-3GPP standards for a mobile core network, often referred to as a mobile core network, such as WWAN network infrastructure 120 as shown in FIG. 1, an AMF/MME interfaces with an SMF/PGW-C which can further interface with one or more UPFs. An AMF/MME and an SMF/PGW-C can further interface with a Policy Control Function (PCF)/Policy Control and Charging Rules Function (PCRF), an HSS/UDM/UDR, and various other core network functions via 3GPP Service-Based Interface (SBI) constructs/interfaces. An AMF/PGW-C and a UPF/PGW-U can further interface with a RAN node, such as one or more gNBs (e.g., WWAN radio node 112).

One or more wireless device sessions, often referred to as Protocol Data Unit (PDU) sessions can be established between a wireless device and a UPF/PGW-U for a core network in which the session may be facilitated/managed by an SMF/PGW-C, as is generally understood in the art.

Generally, a radio access may include one or more radio access network (RAN) radio nodes that may implement a wireless wide area (WWA) (e.g., cellular) air interface and, in some instances also a wireless local area (WLA) (e.g., Wi-Fi®) air interface, for any combination of Radio Access Technology (RAT) types (e.g., 'accesses') for, 3GPP WWA licensed spectrum accesses (e.g., Fourth Generation/Long Term Evolution (4G/LTE), 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, a WWAN RAN radio node may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more wireless devices (e.g., UE 102A and UE 102B), may utilize to connect for one or more sessions (e.g., voice/IMS, data/internet (e.g., video, gaming, etc.), combinations thereof, etc.).

In some instances, a radio node, such as a Wi-Fi AP (e.g., WLAN radio node/WLC 116, in at least one embodiment), may implement a WLA area interface alone in order to provide facilitate WLAN accesses (e.g., 802.11, including any variation thereof, such as 802.11a, 802.11b, 802.11g, 802.11ac (Wi-Fi 5), 802.11ax (Wi-Fi 6/6E), 802.11be (Wi-Fi 7), and/or any future variation that may be implemented). Such a WLAN radio node/WLC may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more WLAN access types through which one or more wireless devices (e.g., UE 102A and UE 102B), may utilize to connect for one or more sessions (e.g., voice/IMS, data/internet (e.g., video, gaming, etc.), combinations thereof, etc.).

A wireless device, such as UE 102A and 102B, or any other wireless devices discussed herein, may be considered any electronic device, etc. that initiates a connection or communication session with a corresponding core network, and may be inclusive of but not limited to a computer, a mobile phone or mobile communication device, an electronic tablet, a laptop, etc. an electronic device such as an industrial device (e.g., a robot), automation device, enterprise device, appliance, Internet of Things (IoT) device, a router with a WWA/WLA interface, a WWA/WLA (cellular/Wi-Fi®) enabled device, and/or any other device, component, element, or object capable of initiating voice, audio, video, media, or data exchanges within a system. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of one or more RAN(s).

Generally, an AMF and an MME may facilitate access and mobility management control/services for one or more UEs. Generally, an SMF and a PGW-C may be responsible for wireless device session management, with individual functions/services being supported on a per-session basis in order to facilitate data transfer(s) between a wireless device and one or more networks via one or more UPFs. Generally, a PGW-U and a UPF may operate to provide packet routing and forwarding operations for user data traffic and may also perform a variety of functions such as packet inspection, traffic optimization, Quality of Service (QoS), policy enforcement and user data traffic handling (e.g., to/from one or more data networks), and billing operations (e.g., accounting, etc.) for wireless device sessions. Typically, an HSS and a UDM stores subscription data (typically in combination with a Unified Data Repository (UDR)) for subscribers (e.g., a user associated with a given wireless device) that can be retrieved and/or otherwise obtained/utilized during operation of a core network system.

Generally, a WLC can facilitate management/configuration of one or more WLAN radio nodes of a WLAN. Generally, a SaMOG facilitates IP access from trusted non-3GPP access networks to a 3GPP core network (e.g., to WWAN network infrastructure 120) via the 3GPP S2a interface. Generally, a SaMOG can operate in coordination with an AAA server, which can facilitate authentication and authorization decisions regarding connection to a WLAN.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by an authentication server of a wireless local area network (WLAN) comprising:
   for a user equipment that is connected to a New Radio (NR) radio band of a wireless wide area network (WWAN) and is seeking to connect to the WLAN, querying a subscription data management element of the WWAN to obtain a location indicator of the user equipment within the WWAN and an NR radio band indicator for the user equipment that identifies the NR radio band of the WWAN to which the user equipment is connected;

determining, based on the location indicator of the user equipment within the WWAN and the NR radio band indicator for the user equipment, whether the user equipment is allowed or required to offload from the WWAN to the WLAN; and based on determining that the user equipment is allowed or required to offload from the WWAN to the WLAN, facilitating a WLAN association response message to be sent to the user equipment for offloading the user equipment to the WLAN.

2. The method of claim 1, wherein the NR radio band indicator for the user equipment is a Radio Access Technology (RAT)/Frequency Selection Priority (RFSP) index that identifies the NR radio band of the WWAN to which the user equipment is connected.

3. The method of claim 2, wherein the querying includes sending a User-Data-Request (UDR) message to the subscription data management element of the WWAN identifying:

that authentication server seeks to obtain the location indicator of the user equipment within the WWAN; and that the authentication server seeks to obtain the RFSP index that identifies the NR radio band to which the user equipment is connected.

4. The method of claim 3, wherein the location indicator of the user equipment within the WWAN is provided by a mobility management node of the WWAN.

5. The method of claim 3, wherein the authentication server obtains a User-Data-Answer (UDA) message from the subscription data management element that includes the location indicator of the user equipment within the WWAN and the RFSP index that identifies the NR radio band to which the user equipment is connected.

6. The method of claim 5, wherein the location indicator of the user equipment within the WWAN is a Tracking Area Identity (TAI) associated with a WWAN radio node to which the user equipment is connected.

7. The method of claim 1, wherein the authentication server of the WLAN includes an offload configuration that identifies:

at least one of:
one or more locations of the WWAN for which offload is allowed from the WWAN to the WLAN; or
one or more locations of the WWAN for which offload is not allowed from the WWAN to the WLAN;
one or more NR radio bands for which offload is allowed from the WWAN to the WLAN; and
one or more NR radio bands for which offload is not allowed from the WWAN to the WLAN.

8. The method of claim 7, wherein the offload configuration identifies that offload is not allowed for a 2.5 Gigahertz (GHz) New Radio (NR) radio band at a particular location of the WWAN.

9. The method of claim 8, wherein the offload configuration identifies that offload is allowed or required for a 700 Megahertz (MHz) NR radio band at the particular location of the WWAN.

10. The method of claim 1, wherein the subscription data management element of the WWAN is a combined Unified Data Management (UDM)/Home Subscriber Server (HSS) element.

11. One or more non-transitory computer readable storage media encoded with instructions that, when executed by a processor of an authentication server of a wireless local area network (WLAN), cause the processor to perform operations, comprising:

for a user equipment that is connected to a New Radio (NR) radio band of a wireless wide area network (WWAN) and is seeking to connect to the WLAN, querying a subscription data management element of the WWAN to obtain a location indicator of the user equipment within the WWAN and an NR radio band indicator for the user equipment that identifies the NR radio band of the WWAN to which the user equipment is connected;

determining, based on the location indicator of the user equipment within the WWAN and the NR radio band indicator for the user equipment, whether the user equipment is allowed or required to offload from the WWAN to the WLAN; and based on determining that the user equipment is allowed or required to offload from the WWAN to the WLAN, facilitating a WLAN association response message to be sent to the user equipment for offloading the user equipment to the WLAN.

12. The media of claim 11, wherein the NR radio band indicator for the user equipment is a Radio Access Technology (RAT)/Frequency Selection Priority (RFSP) index that identifies the NR radio band of the WWAN to which the user equipment is connected.

13. The media of claim 12, wherein the querying includes sending a User-Data-Request (UDR) message to the subscription data management element of the WWAN identifying:

that authentication server seeks to obtain the location indicator of the user equipment within the WWAN; and that the authentication server seeks to obtain the RFSP index that identifies the NR radio band to which the user equipment is connected.

14. The media of claim 13, wherein the authentication server obtains a User-Data-Answer (UDA) message from the subscription data management element that includes the location indicator of the user equipment within the WWAN and the RFSP index that identifies the NR radio band to which the user equipment is connected.

15. The media of claim 11, wherein the authentication server of the WLAN includes an offload configuration that identifies:

at least one of:
one or more locations of the WWAN for which offload is allowed from the WWAN to the WLAN; or
one or more locations of the WWAN for which offload is not allowed from the WWAN to the WLAN;
one or more NR radio bands for which offload is allowed from the WWAN to the WLAN; and
one or more NR radio bands for which offload is not allowed from the WWAN to the WLAN.

16. An authentication server of a wireless local area network (WLAN), comprising:

at least one memory element for storing data; and at least one processor for executing instructions associated with the data, wherein executing the instructions causes the authentication server to perform operations, comprising:

for a user equipment that is connected to a New Radio (NR) radio band of a wireless wide area network (WWAN) and is seeking to connect to the WLAN, querying a subscription data management element of the WWAN to obtain a location indicator of the user equipment within the WWAN and an NR radio band indicator for the user equipment that identifies the NR radio band of the WWAN to which the user equipment is connected;

determining, based on the location indicator of the user equipment within the WWAN and the NR radio band indicator for the user equipment, whether the user equipment is allowed or required to offload from the WWAN to the WLAN; and based on determining that the user equipment is allowed or required to offload from the WWAN to the WLAN, facilitating a WLAN association response message to be sent to the user equipment for offloading the user equipment to the WLAN.

17. The authentication server of claim 16, wherein the NR radio band indicator for the user equipment is a Radio Access Technology (RAT)/Frequency Selection Priority (RFSP) index that identifies the NR radio band of the WWAN to which the user equipment is connected.

18. The authentication server of claim 17, wherein the querying includes sending a User-Data-Request (UDR) message to the subscription data management element of the WWAN identifying:

that authentication server seeks to obtain the location indicator of the user equipment within the WWAN; and that the authentication server seeks to obtain the RFSP index that identifies the NR radio band to which the user equipment is connected.

19. The authentication server of claim 18, wherein the authentication server obtains a User-Data-Answer (UDA) message from the subscription data management element that includes the location indicator of the user equipment within the WWAN and the RFSP index that identifies the NR radio band to which the user equipment is connected.

20. The authentication server of claim 16, wherein the authentication server of the WLAN includes an offload configuration that identifies that offload is not allowed for a 2.5 Gigahertz (GHz) New Radio (NR) radio band at a particular location of the WWAN.

* * * * *